United States Patent Office 2,751,410
Patented June 19, 1956

2,751,410

3-PHENYLSALICYLAMIDE

Melville Sahyun and John A. Faust, Santa Barbara, Calif., assignors, by mesne assignments, to Cutter Laboratories, Inc., Berkeley, Calif., a corporation of California No Drawing. Application March 11, 1954, Serial No. 415,696

1 Claim. (Cl. 260—559)

This invention relates to 3-phenylsalicylamide and a process whereby such compound may be prepared.

The compound of the present invention is a crystalline solid, insoluble in water, but soluble in ethanol and ether. This compound, in preliminary pharmacological testing, has indicated outstanding utility as an analgesic agent.

The compound of the present invention may be readily prepared by an ammonolysis type reaction involving the interaction of methyl 3-phenylsalicylate and ammonia. The ammonia and methyl 3-phenylsalicylate are contacted in the presence of a suitable solvent and in a suitable container for an extended period, usually at least two days, however, longer times may be used. If pressure apparatus is used, this time may be decreased. Representative solvents which may be employed include, for example, methanol, ethanol, isopropanol, et cetera. The resulting 3-phenylsalicylamide is separated from the resulting mixture in conventional manner, as by removal of unreacted ammonia and solvent and recrystallization.

The following example more specifically describes the method of the present invention, but it is not be construed as limiting the invention thereto.

Example

Twenty-two and eight-tenths (22.8) grams (0.1 mole) of methy 3-phenylsalicylate and 200 milliliters of methanol were admixed in a citrate bottle and the resulting admixture titrated with ammonia. The citrate bottle was immediately capped and the contents permitted to stand at room temperature for six days, after which time the methanol and excess ammonia were removed by distillation, leaving a brown, solid residue. The solid material was taken up in isopropanol and then purified with activated charcoal. Upon dilution of the thus-clarified isopropanol solution with water, 16.2 grams (76 percent of the theoretical yield) of colorless needles of 3-phenylsalicylamide, melting at 142–143 degrees centigrade, was obtained. Reworking of the mother liquor increased the yield to ninety percent of the theoretical.

Analysis:
   Calculated _____percent__ N, 6.5
   Found _____do____    6.37

This material has a molecular weight of 213.23 and a corrected purified melting point of 139.5–140.5 degrees centigrade.

Pharmacological studies in animals of 3-phenylsalicylamide when compared against two well-known analgesic agents gave the following results:

Table

| Compound | Lethal Dose$_{50}$ | Effective Dose$_{50}$ | Analgetic Degree | Therapeutic Index LD$_{50}$/ED$_{50}$ |
|---|---|---|---|---|
| Acetyl Salicylic Acid_ | 500 | 350 | Slight_____ | 1.4 |
| Salicylamide_____ | 480 | 175 | ____do_____ | 3.0 |
| 3-Phenylsalicylamide | 1,500 | 350 | Pronounced_ | 4.0 |

This application is a continuation-in-part of our prior application Serial 292,581, filed June 9, 1952, now abandoned.

Various modifications may be made in the method and compounds of the present invention without departing from the spirit or scope thereof and it is to be understood that we limit ourselves only as defined in the appended claim.

We claim:
3-phenylsalicylamide.

References Cited in the file of this patent

UNITED STATES PATENTS 2,190,829   Graves _____ Feb. 20, 1940
2,570,502   Surine _____ Oct. 9, 1951

OTHER REFERENCES

Graebe et al.: "Liebigs Annalen," vol. 284 (1895), p. 322.

Way et al.: "J. Pharmacol. Exptl. Therap.," vol. 108, August 1953, (received February 27, 1953), pp. 450–60.